United States Patent
You et al.

(10) Patent No.: US 9,973,709 B2
(45) Date of Patent: May 15, 2018

(54) NOISE LEVEL CONTROL DEVICE FOR A WIDE DYNAMIC RANGE IMAGE AND AN IMAGE PROCESSING SYSTEM INCLUDING THE SAME

(71) Applicant: SAMSUNG ELECTRONICS CO., LTD., Suwon-si, Gyeonggi-do (KR)

(72) Inventors: Jong Min You, Seongnam-si (KR); Ji Hye Kim, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 156 days.

(21) Appl. No.: 14/941,868

(22) Filed: Nov. 16, 2015

(65) Prior Publication Data
US 2016/0150146 A1    May 26, 2016

(30) Foreign Application Priority Data
Nov. 24, 2014 (KR) .......................... 10-2014-0164118

(51) Int. Cl.
*H04N 5/225* (2006.01)
*H04N 5/235* (2006.01)

(52) U.S. Cl.
CPC ................................ *H04N 5/2355* (2013.01)

(58) Field of Classification Search
None
See application file for complete search history.

(56) References Cited

U.S. PATENT DOCUMENTS

| | | | |
|---|---|---|---|
| 7,995,115 B2 | 8/2011 | Kurane | |
| 8,346,008 B2 | 1/2013 | Lin | |
| 8,373,776 B2 | 2/2013 | Iijima et al. | |
| 8,514,323 B2 | 8/2013 | Kino et al. | |
| 8,553,110 B2 | 10/2013 | Johansson | |
| 2005/0046708 A1* | 3/2005 | Lim ........................ | H04N 5/235 348/231.6 |
| 2009/0046947 A1 | 2/2009 | Kobayashi | |
| 2011/0032403 A1* | 2/2011 | Mabuchi ............ | H04N 5/35581 348/296 |

(Continued)

FOREIGN PATENT DOCUMENTS

| | | |
|---|---|---|
| JP | 2011-101180 | 5/2011 |
| JP | 2013-240031 | 11/2013 |

*Primary Examiner* — Twyler L Haskins
*Assistant Examiner* — Dwight Alex C Tejano
(74) *Attorney, Agent, or Firm* — F. Chau & Associates, LLC

(57) ABSTRACT

An image processing device includes a first wide dynamic range (WDR) image generation block, a control signal generator, and a second WDR image generation block. The first WDR image generation block processes a long-exposure image signal to generate a first image signal, processes a short-exposure image signal using a second weight value to generates a second image signal, and to synthesize the first image signal and the second image signal to generate a first WDR image signal. The control signal generator calculates a difference between the second weight value and a reference weight value and generates control signals according to a result of the calculation. The second WDR image generation block adjusts a noise level of the first WDR image signal using the control signals and generates a second WDR image signal according to a result of the adjustment.

20 Claims, 16 Drawing Sheets

(56) References Cited

U.S. PATENT DOCUMENTS

| | | | |
|---|---|---|---|
| 2011/0194850 A1* | 8/2011 | Joo | H04N 5/235 |
| | | | 396/213 |
| 2012/0038797 A1 | 2/2012 | Jang et al. | |
| 2012/0050557 A1* | 3/2012 | Atanassov | H04N 5/35581 |
| | | | 348/222.1 |
| 2012/0281111 A1* | 11/2012 | Jo | H04N 5/217 |
| | | | 348/229.1 |
| 2012/0327270 A1* | 12/2012 | Shirakawa | H04N 5/2356 |
| | | | 348/239 |

* cited by examiner

FIG. 8

| BRIGHTNESS OF EACH PIXEL OF LLEI/ILEI | WL | BRIGHTNESS OF EACH PIXEL OF LSEI/ISEI | WS | BRIGHTNESS OF EACH PIXEL OF WDR1 |
|---|---|---|---|---|
| IL1 | WL1 | IS1 | WS1 | SY1=WS1×IS1+WL1×IL1 |
| IL2 | WL2 | IS2 | WS2 | SY2=WS2×IS2+WL2×IL2 |
| ... | ... | ... | ... | ... |
| IL15 | WL15 | IS15 | WS15 | SY15=WS15×IS15+WL15×IL15 |
| IL16 | WL16 | IS16 | WS16 | SY16=WS16×IS16+WL16×IL16 |

NOISE LEVEL CONTROL DEVICE FOR A WIDE DYNAMIC RANGE IMAGE AND AN IMAGE PROCESSING SYSTEM INCLUDING THE SAME

CROSS-REFERENCE TO RELATED APPLICATION

This application claims priority under 35 U.S.C. § 119(a) to Korean Patent Application No. 10-2014-0164118, filed on Nov. 24, 2014, in the Korean Intellectual Property Office, the disclosure of which is incorporated by reference herein in its entirety.

TECHNICAL FIELD

Embodiments of the present inventive concept relate to a noise level control device for a wide dynamic range (WDR) image, and more particularly, to a noise level control device, an operating method of the noise level control device, and an image processing system including the noise level control device.

DISCUSSION OF THE RELATED ART

An image processing device may include an image sensor which converts an optical signal into an electrical signal and an image processor which processes the converted electrical signal to be output to a display device. To properly display both a dark portion and a bright portion of an image at the same time, a wide dynamic range (WDR) technology may be used in the image processing device.
The WDR technology may synthesize an image and make adjustment to the exposure time to make both the bright portion and the dark portion visible.

SUMMARY

According to an exemplary embodiment of the present inventive concept, an image processing device is provided. The device includes a first wide dynamic range (WDR) image generation block, a control signal generator, and a second WDR image generation block. The first WDR image generation block is configured to process a long-exposure image signal, to generate a first image signal according to a result of the processing on the long-exposure image signal, to process a short-exposure image signal using a second weight value, to generate a second image signal according to a result of the processing on the short-exposure image signal, and to synthesize the first image signal and the second image signal to generate a first WDR image signal. The control signal generator is configured to calculate a difference between the second weight value and a reference weight value, and to generate control signals according to a result of the calculation. The second WDR image generation block is configured to adjust a noise level of the first WDR image signal using the control signals, and to generate a second WDR image signal according to a result of the adjustment. The long-exposure image signal is generated using a first exposure time. The short-exposure image signal is generated using a second exposure time shorter than the first exposure time.

The first WDR image generation block may linearize each of the short-exposure image signal and the long-exposure image signal, generate the first image signal by applying the first weight value to the linearized long-exposure image signal, and generate the second image signal by applying the second weight value to the linearized short-exposure image signal.

The first WDR image generation block may interpolate the linearized long-exposure image signal to generate a first interpolation signal, apply the first weight value to the first interpolation signal to generate the first image signal, interpolate the linearized short-exposure image signal to generate a second interpolation signal, and apply the second weight value to the second interpolation signal to generate the second image signal.

A sum of the first weight value and the second weight value may be one.

The first weight value may be determined based on at least one of a brightness value, a sharpness value, or a contrast value of the long-exposure image signal. The second weight value may be determined based on at least one of a brightness value, a sharpness value, or a contrast value of the short-exposure image signal.

The reference weight value may be determined based on at least one of a brightness value, a sharpness value, or a contrast value of the short-exposure image signal.

The reference weight value may be extracted from a look-up table stored in the control signal generator.

The control signals may include a noise reduction strength control signal and a noise gain control signal.

When the second weight value is larger than the reference weight value, the control signal generator may increase the noise reduction strength control signal and decrease the noise gain control signal as the difference between the second weight value and the reference weight value increases.

When the second weight value is larger than the reference weight value, the control signal generator may decrease the noise reduction strength control signal and increase the noise gain control signal as the difference between the second weight value and the reference weight value decrease.

The control signal generator may include a reference weight block, a noise reduction strength control signal generator, and a noise gain control signal generator. The reference weight block may be configured to determine the reference weight value. The noise reduction strength control signal generator may be configured to calculate the difference between the second weight value and the reference weight value, and to generate the noise reduction strength control signal by using the first WDR image signal and the difference between the second weight value and the reference weight value. The noise gain control signal generator may be configured to generate the noise gain control signal by using the noise reduction strength control signal, the second weight value, and the first WDR image signal.

The second WDR image generation block may include a noise reduction circuit, a noise gain generator, and an operation block. The noise reduction circuit may be configured to extract a noise-free image signal and a noise image signal from the first WDR image signal in response to the noise reduction strength control signal. The noise gain generator may be configured to generate a noise gain for the first WDR image signal in response to the noise gain control signal. The operation block may be configured to generate a final noise image signal by multiplying the noise image signal and the noise gain, and to generate the second WDR image signal by adding the final noise image signal and the noise-free image signal.

According to an exemplary embodiment of the present inventive concept, an image processing system is provided. The image processing system may include an image sensor and a noise level control device. The image sensor is configured to output a long-exposure image signal and a short-exposure image signal. The noise level control device is configured to process the long-exposure image signal and the short-exposure image signal, and to adjust a noise level of a first WDR image signal, and to generate a second WDR image signal according to a result of the adjustment. The noise level control device includes a first WDR image generation block, a control signal generator, and a second WDR image generation block. The first WDR image generation block is configured to process the long-exposure image signal using a first weight value, to generate a first image signal according to a result of the processing on the long-exposure image signal, to process the short-exposure image signal using a second weight value, to generate a second image signal according to a result of the processing on the short-exposure image signal, and to synthesize the first image signal and the second image signal to generate the first WDR image signal. The control signal generator is configured to calculate a difference between the second weight value and a reference weight value, and to generate control signals according to a result of the calculation. The second WDR image generation block is configured to adjust a noise level of the first WDR image signal using the control signals, and to generate the second WDR image signal according to a result of the adjustment. The long-exposure image signal is generated using a first exposure time. The short-exposure image signal is generated using a second exposure time shorter than the first exposure time.

The noise level control device may be embodied as an integrated circuit or a chip.

The noise level control device may be included in the image sensor.

The noise level control device may be included in an application processor.

The first weight value may be determined based on at least one of a brightness value, a sharpness value, or a contrast value of the long-exposure image signal. The second weight value may be determined based on at least one of a brightness value, a sharpness value, or a contrast value of the short-exposure image signal.

The reference weight value may be determined based on at least one of a brightness value, a sharpness value, or a contrast value of the short-exposure image signal.

The reference weight value may be extracted from a look-up table stored in the control signal generator.

The control signals may include a noise reduction strength control signal and a noise gain control signal.

The second WDR image generation block may include a noise reduction circuit, a noise gain generator, and an operation block. The noise reduction circuit may be configured to extract a noise-free image signal and a noise image signal from the first WDR image signal in response to the noise reduction strength control signal. The noise gain generator may be configured to generate a noise gain for the first WDR image signal in response to the noise gain control signal. The operation block may be configured to generate a final noise image signal by multiplying the noise image signal and the noise gain, and to generate the second WDR image signal by adding the final noise image signal and the noise-free image signal.

According to an exemplary embodiment of the present inventive concept, an image processing method is provided. The image processing method includes determining a first weight value based on a long-exposure image signal generated using a first exposure time, determining a second weight value based on a short-exposure image signal generated using a second exposure time shorter than the first exposure time, generating a first image signal based on the first weight value and the long-exposure image signal, generating a second image signal based on the second weight value and the short-exposure image signal, generating a third image signal by combining the first image signal and the second image signal, adjusting a noise level of the third image signal using control signals, and generating a fourth image signal based on a result of the adjustment of the third image signal.

The control signals may include a noise reduction strength control signal and a noise gain control signal generated based on a difference between the second weight value and a reference weight value.

The first weight value may be determined based on at least one of a brightness value, a sharpness value, or a contrast value of the long-exposure image signal, and the second weight value may be determined based on at least one of a brightness value, a sharpness value, or a contrast value of the short-exposure image signal.

The reference weight value may be determined based on at least one of a brightness value, a sharpness value, or a contrast value of the short-exposure image signal.

The adjusting a noise level of the third image signal may include extracting a noise free image signal and a noise image signal from the first image signal using the noise reduction strength control signal, generating a noise gain corresponding to the first image signal using the noise gain control signal, generating a final noise image signal by using the noise image signal and the noise gain, and generating the fourth image signal by using the final noise image signal and the noise free image signal.

BRIEF DESCRIPTION OF THE DRAWINGS

The above and/or other aspects of the present inventive concept will become more apparent and more readily appreciated from the following description of the embodiments, taken in conjunction with the accompanying drawings of which:

FIG. 8 is a table illustrating a synthesis process shown in FIG. 7 which is performed by a synthesis block according to an exemplary embodiment of the present inventive concept;

DETAILED DESCRIPTION OF THE EMBODIMENTS

Figure 1:
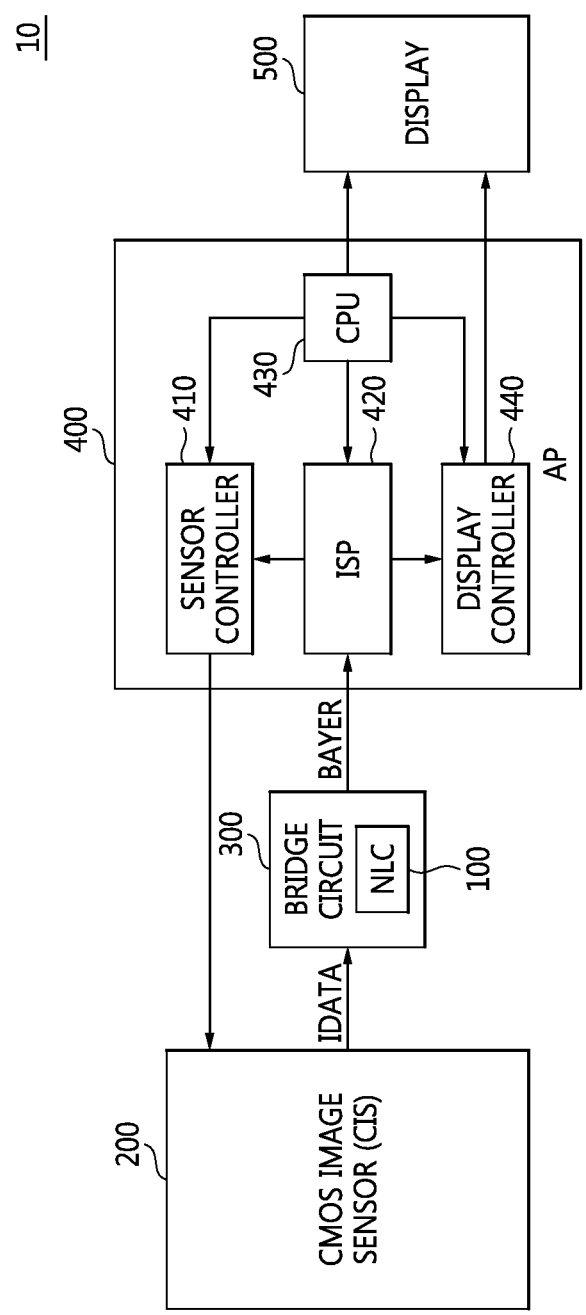
FIG. 1 is a block diagram of an image processing system according to an exemplary embodiment of the present inventive concept.

The present inventive concept now will be described more fully hereinafter with reference to the accompanying drawings, in which embodiments of the present inventive concept are shown. The present inventive concept may, however, be embodied in many different forms without departing from the spirit and scope of the present inventive concept and should not be construed as limited to the embodiments set forth herein. In the drawings, the size and relative sizes of layers and regions may be exaggerated for clarity. Like numbers may refer to like elements throughout the specification and drawings. As used herein, the term "and/or" includes any and all combinations of one or more of the associated listed items and may be abbreviated as "/". As used herein, the singular forms "a", "an" and "the" are intended to include the plural forms as well, unless the context clearly indicates otherwise.

FIG. 1 is a block diagram of an image processing system according to an exemplary embodiment of the present inventive concept. Referring to FIG. 1, an image processing system 10 may be embodied in a personal computer (PC), a mobile computing device, or the like. The mobile computing device may be embodied as a laptop computer, a mobile phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an internet of things (IoT) device, an internet of everything (IoE) device, or the like.

The image processing system 10 may include a complementary metal-oxide semiconductor (CMOS) image sensor 200, a bridge circuit 300, an application processor (AP) 400, and a display 500. In an exemplary embodiment of the present inventive concept shown in FIG. 1, the bridge circuit 300 may include a noise level control device 100 which can adjust a noise level included in a wide dynamic range (WDR) image. The bridge circuit 300 may be embodied as an integrated circuit (IC), a single chip, or the like.

The noise level control device 100 may increase sharpness of an image which includes a bright portion (for example, outdoor) and a dark portion (for example, indoor) having a large difference in illuminance by synthesizing images taken at different exposure times from each other to generate a final WDR image. When synthesizing the images taken at the different exposure times from each other, the noise level control device 100 may synthesize the images on a pixel basis which applies different weight values to each of the images.

According to an exemplary embodiment of the present inventive concept, the noise level control device 100 may generate a final WDR image by applying different weight values to each of the images, on a pixel basis, taken at the different exposure times and synthesizing the images. Here, a pixel may correspond to pixel data, and may have an RGB data format, a YUV data format, an YCbCr data format, or the like, however, a pixel of the present inventive concept is not limited thereto.

According to an exemplary embodiment of the present inventive concept, when synthesizing images taken at the different exposure times, the noise level control device 100 may synthesize the images on a block basis. According to an exemplary embodiment of the present inventive concept, when synthesizing the images taken at the different exposure times, the noise level control device 100 may synthesize the images on a pixel basis using a gradient domain.

As shown in FIG. 1, the noise level control device 100 may be embodied in the bridge circuit 300. The noise level control device 100 may generate a final WDR image for an image data IDATA output from the CMOS image sensor 200. A configuration and an operation of the noise level control device 100 will be described in detail with reference to FIGS. 4 to 14. The CMOS image sensor 200 may generate the image data IDATA for a subject which is input (or captured) through an optical lens.

The bridge circuit 300 may receive the image data IDATA output from the CMOS image sensor 200, generate a Bayer pattern BAYER corresponding to the image data IDATA, and transmit the Bayer pattern BAYER to the AP 400. For example, the bridge circuit 300 may perform a role of mediating between the CMOS image sensor 200 and the AP 400 by converting the image data IDATA output from the CMOS image sensor 200 into signals which can be used in the AP 400.

The AP 400 may include a sensor controller 410, an image signal processor (ISP) 420, a central processing unit (CPU) 430, and a display controller 440. The AP 400 may be an exemplary embodiment of a processor and may be embodied as an integrated circuit (IC), a system on chip (SoC), a mobile AP, or the like.

The sensor controller 410 may generate various types of control signals for controlling operations of the CMOS image sensor 200 and transmit the generated control signals to the CMOS image sensor 200 according to a control of the CPU 430.

The ISP 420 may process the Bayer pattern BAYER corresponding to the image data IDATA transmitted from the bridge circuit 300 to generate RGB image data. For example, the ISP 420 may process the Bayer pattern BAYER so that the image data IDATA may be displayed on the display 500, and transmit the processed image data to the display 500. According to an exemplary embodiment of the present inventive concept, each of the ISP 420 and the CMOS image sensor 200 may be embodied as a chip, and may be packed into a single package, e.g., a multi-chip package (MCP). According to an exemplary embodiment of the present inventive concept, the ISP 420 and the CMOS image sensor 200 may be embodied as a single chip.

The CPU 430 may control the sensor controller 410, the ISP 420, and the display controller 440. The display controller 440 may generate various types of control signals for controlling the display 500, and transmit the generated control signals to the display 500 according to a control of the CPU 430. The display controller 440 may transmit image data to the display 500 through a MIPI display serial interface (DSI), an embedded DisplayPort (eDP), or the like.

The display 500 may receive the control signals and the image data transmitted from the display controller 440, and display the image data according to the control signals. For example, the display 500 may be embodied as a thin film transistor-liquid crystal display (TFT-LCD), a light emitting diode (LED) display, an organic LED (OLED) display, an active-matrix OLED (AMOLED) display, a flexible display, a transparent display, or the like.

Figure 2:
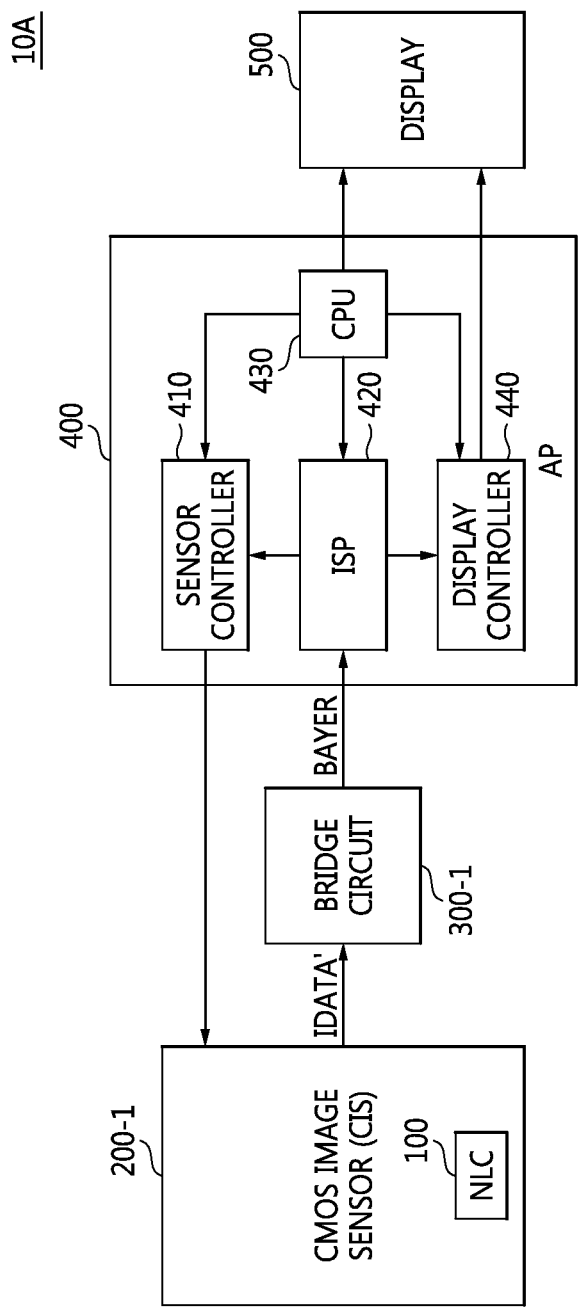
FIG. 2 is a block diagram of an image processing system according to an exemplary embodiment of the present inventive concept.

FIG. 2 is a block diagram of an image processing system according to an exemplary embodiment of the present inventive concept. Referring to FIG. 2, an image processing system 10A may include a CMOS image sensor 200-1, a bridge circuit 300-1, the AP 400, and the display 500. Except that the noise level control device 100 is not embodied in the bridge circuit 300-1 and embodied in the CMOS image sensor 200-1 in FIG. 2, a structure and an operation of the image processing system 10A of FIG. 2 are substantially the same as or similar to the structure and the operation of the image processing system 10 of FIG. 1. The noise level control device 100 embodied in the CMOS image sensor 200-1 may generate a final WDR image for image data generated by the CMOS image sensor 200-1. The CMOS image sensor 200-1 may transmit image data IDATA' processed by the noise level control device 100 to the bridge circuit 300-1.

Figure 3:
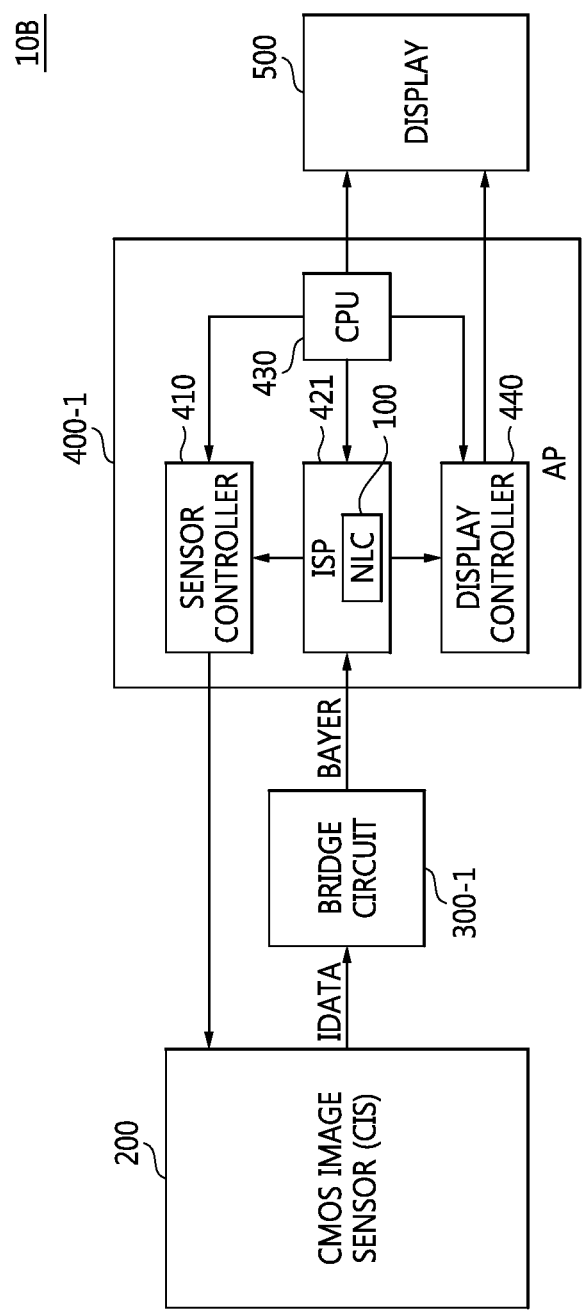
FIG. 3 is a block diagram of an image processing system according to an exemplary embodiment of the present inventive concept.

FIG. 3 is a block diagram of an image processing system according to an exemplary embodiment of the present inventive concept. Referring to FIG. 3, an image processing system 10B may include the CMOS image sensor 200, the bridge circuit 300-1, an AP 400-1, and the display 500. Except that the noise level control device 100 is not embodied in the bridge circuit 300-1 and embodied in the AP 400-1 in FIG. 3, a structure and an operation of the image processing system 10B of FIG. 3 are substantially the same as or similar to the structure and the operation of the image processing system 10 of FIG. 1.

The noise level control device 100 embodied in the ISP 421 may generate a final WDR image corresponding to the RGB image data when the ISP 421 processes or generates the RGB image data from the Bayer pattern BAYER.

Figure 4:
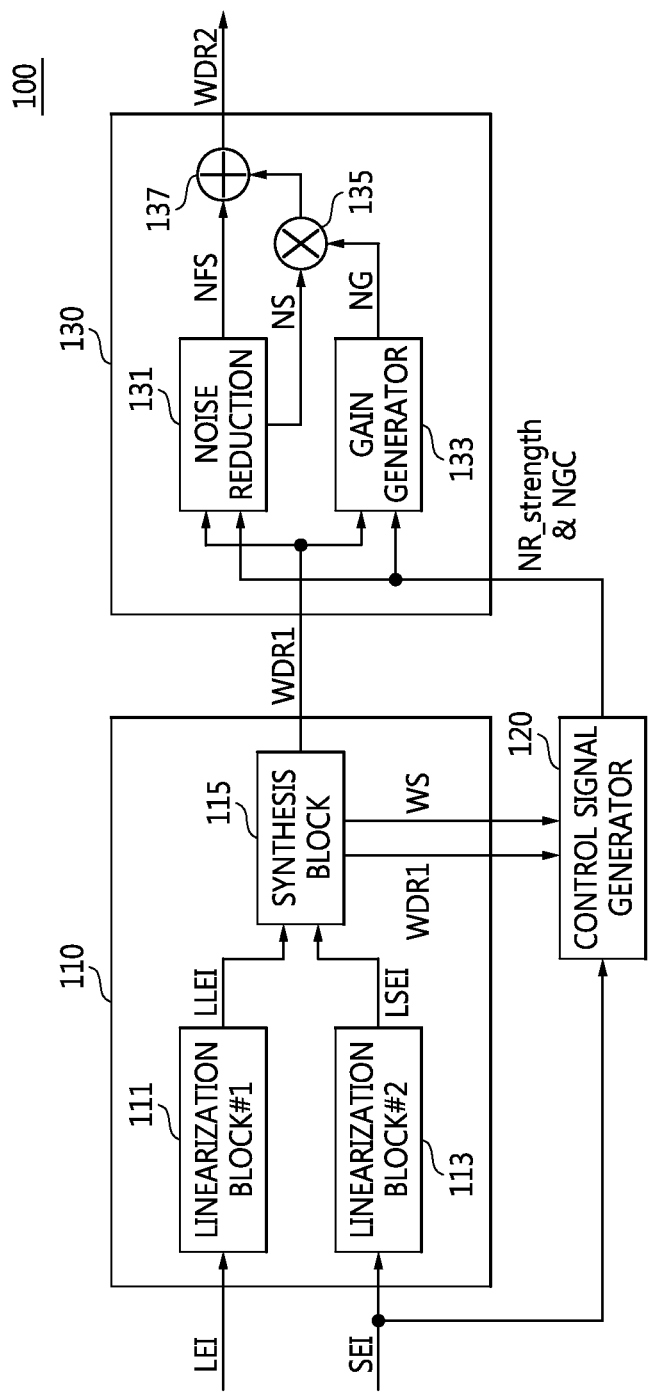
FIG. 4 is a block diagram of a noise level control device for a wide dynamic range (WDR) image according to an exemplary embodiment of the present inventive concept.

FIG. 4 is a block diagram of a noise level control device for a WDR image according to an exemplary embodiment of the present inventive concept. Referring to FIG. 4, the noise level control device 100 may include a first WDR image generation block 110, a control signal generator 120, and a second WDR image generation block 130. According to an exemplary embodiment of the present inventive concept, the noise level control device 100 may be embodied in the bridge circuit 300 of FIG. 1, the CMOS image sensor 200-1 of FIG. 2, or the ISP 421 of FIG. 3.

The first WDR image generation block 110 may process a long-exposure image signal LEI having a relatively long exposure time using a first weight value (e.g., WL of FIG. 6), and thus, a first image signal may be generated. In addition, the first WDR image generation block 110 may process a short-exposure image signal SEI having a relatively short exposure time using a second weight value WS, and thus, a second image signal may be generated.

The first WDR image generation block 110 may synthesize the first image signal and the second image signal to generate a first wide dynamic range (WDR) image signal WDR1. The first WDR image generation block 110 may include a first linearization block 111, a second linearization block 113, and a synthesis block 115.

The first linearization block 111 may linearize the long-exposure image signal LEI to generate the linearized long-exposure image signal LLEI. The second linearization block 113 may linearize the short-exposure image signal SEI to generate the linearized short-exposure image signal LSEI. Here, linearization may be understood to mean adjusting a first pixel value of a pixel in the long-exposure image signal LLEI and/or a second pixel value of a pixel in the short-exposure image signal SEI so that the first pixel value and the second pixel value may be synthesized.

The synthesis block 115 may receive a linearized long-exposure image signal LLEI from the first linearization block 111, receive a linearized short-exposure image signal LSEI from the second linearization block 113, and synthesize the linearized long-exposure image signal LLEI and the linearized short-exposure image signal LSEI to generate a first WDR image signal WDR1. When synthesizing the two signals LLEI and LSEI, the synthesis block 115 may apply a first weight value (e.g., WL of FIG. 6) to the linearized long-exposure image signal LLEI, and apply a second weight value (e.g., WS) to the linearized short-exposure image signal LSEI. At this time, a sum of the first weight value (e.g., WL of FIG. 6) and the second weight value (e.g., WS) may be "one".

The synthesis block 115 may transmit the first WDR image WDR1 to the second WDR image generation block 130, and transmit the first WDR image signal WDR1 and the second weight value WS to the control signal generator 120. A configuration and an operation of the synthesis block 115 will be described in detail with reference to FIGS. 6 to 8.

The control signal generator 120 may calculate a difference between the second weight value WS and a reference weight value (e.g., WS_R of FIG. 9), and generate control signals (e.g., NR_strength and NGC) according to a result of the calculation. At this time, the control signals NR_strength and NG may include a noise reduction strength control signal NR_strength and a noise gain control signal NGC.

The noise reduction strength control signal NR_strength may be transmitted to the second WDR image generation block 130, and the noise reduction strength control signal NR_strength may control an extent to which the noise reduction circuit 131 can extract a noise image signal NS from the first WDR image signal WDR1. The noise gain control signal NGC may be transmitted to the second WDR image generation block 130, and the noise gain control signal NGC may be used in a process in which the noise gain generator 133 generates a noise gain NG.

According to an exemplary embodiment of the present inventive concept, when the second weight value WS is larger than the reference weight value (e.g., WS_R of FIG. 9), the control signal generator 120 may generate a larger noise reduction strength control signal NR_strength and a smaller noise gain control signal NGC as a difference between the second weight value WS and the reference weight value (e.g., WS_R of FIG. 9) gets larger. According to an exemplary embodiment of the present inventive concept, when the second weight value WS is larger than the reference weight value (e.g., WS_R of FIG. 9), the control signal generator 120 may generate a smaller noise reduction strength control signal NR_strength and a larger noise gain control signal NGC as a difference between the second weight value WS and the reference weight value (e.g., WS_R of FIG. 9) gets smaller. A configuration and an operation of the control signal generator 120 will be described in detail with reference to FIGS. 9 to 12.

The second WDR image generation block 130 may adjust a noise level of the first WDR image signal WDR1 using the control signals NR_strength and NGC, and generate a second WDR image signal WDR2 having the adjusted noise level. The second WDR image generation block 130 may include the noise reduction circuit 131, the noise gain generator 133, and an operation block.

The noise reduction circuit 131 may extract a noise-free image signal NFS and the noise image signal NS from the first WDR image signal WDR1 in response to the noise reduction strength control signal NR_strength. For example, when the noise reduction strength control signal NR_strength is increased, the noise reduction circuit 131 can increase the extent of noise reduction for the first WDR image signal WDR1.

The noise gain generator 133 may generate a noise gain NG for a first WDR image signal WDR1 in response to a noise gain control signal NGC. For example, when the noise gain control signal NGC is increased, the noise gain generator 133 may increase a noise gain NG for the first WDR image signal WDR1.

The operation block may include a multiplier 135 and an adder 137. The multiplier 135 may generate a final noise image signal by multiplying the noise image signal NS and the noise gain NG. The adder 137 may generate the second WDR image signal WDR2 by adding the final noise image signal and the noise-free image signal NFS.

Figure 5:
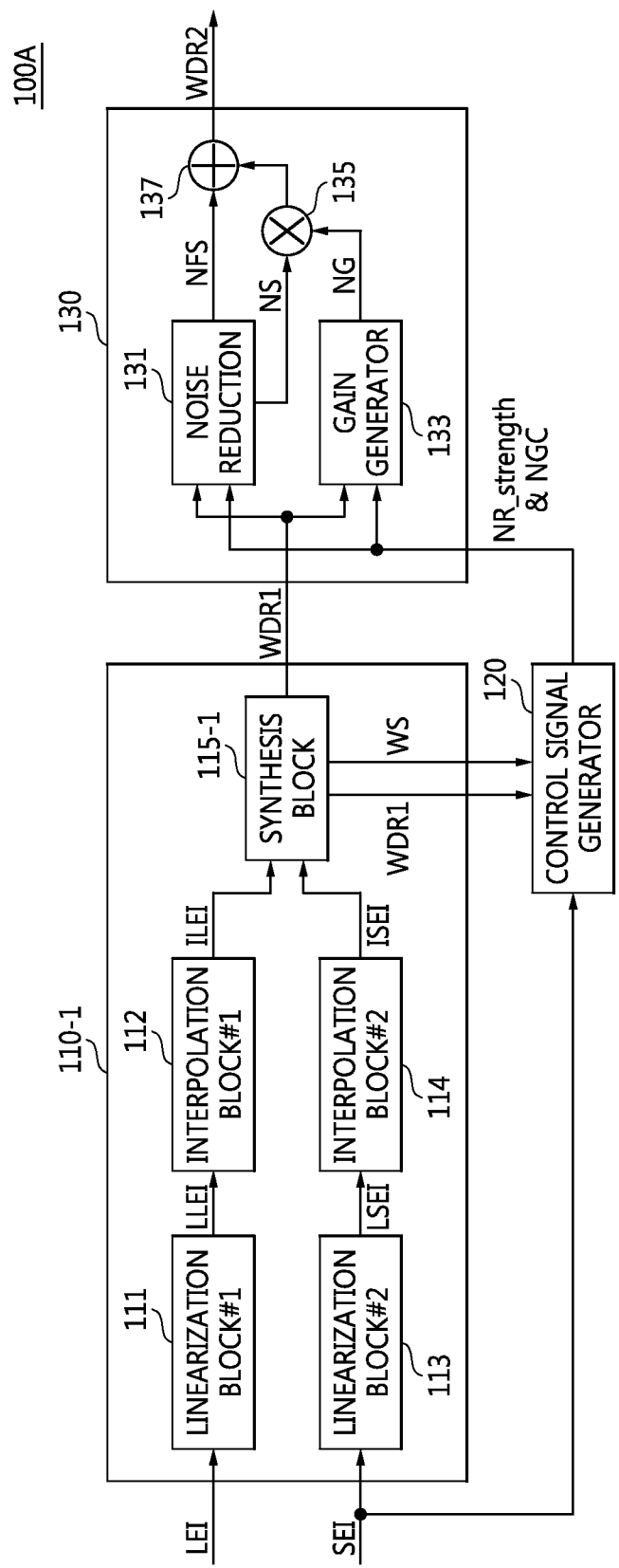
FIG. 5 is a block diagram of a noise level control device for a WDR image according to an exemplary embodiment of the present inventive concept.

FIG. 5 is a block diagram of a noise level control device for a WDR image according to an exemplary embodiment of the present inventive concept. Referring to FIG. 5, a noise level control device 100A may include a first WDR image generation block 110-1, the control signal generator 120, and the second WDR image generation block 130. According to an exemplary embodiment of the present inventive concept, the noise level control device 100A may be embodied in the bridge circuit 300 of FIG. 1, the CMOS image sensor 200-1 of FIG. 2, or the ISP 421 of FIG. 3.

Except that the first WDR image generation block 110-1 further includes interpolation blocks 112 and 114 in FIG. 5, a structure and an operation of a noise level control device 100A of FIG. 5 are substantially the same as or similar to the structure and the operation of the noise level control device 100 of FIG. 4.

The first WDR image generation block 110-1 may include the first linearization block 111, a first interpolation block 112, the second linearization block 113, a second interpolation block 114, and a synthesis block 115-1. The first linearization block 111 may linearize a long-exposure image signal LEI to generate a long-exposure image signal LLEI, and the first interpolation block 112 may interpolate the linearized long-exposure image signal LLEI to generate a first interpolation signal ILEI.

The second linearization block 113 may linearize a short-exposure image signal SEI to generate a linearized short-exposure image signal LSEI, and the second interpolation block 114 may interpolate the linearized short-exposure image signal LSEI to generate a second interpolation signal ISEI. According to an exemplary embodiment of the present inventive concept, the first interpolation signal ILEI and the second interpolation signal ISEI may be image signals having a full-resolution.

The synthesis block 115-1 may receive the first interpolation signal ILEI from the first interpolation block 112, receive the second interpolation signal ISEI from the second interpolation block 114, and synthesize the first interpolation signal ILEI and the second interpolation signal ISEI to generate a first WDR image signal WDR1. The synthesis block 115-1 may apply a first weight value (e.g., WL of FIG. 6) to the first interpolation signal ILEI and apply a second weight value WS to the second interpolation signal ISEI when synthesizing the interpolation signals ILEI and ISEI. At this time, a sum of the first weight value (e.g., WL of FIG. 6) and the second weight value WS may be one.

The synthesis block 115-1 may transmit the first WDR image WDR1 to the second WDR image generation block 130, and transmit the first WDR image signal WDR1 and the second weight value WS to the control signal generator 120.

Figure 6:
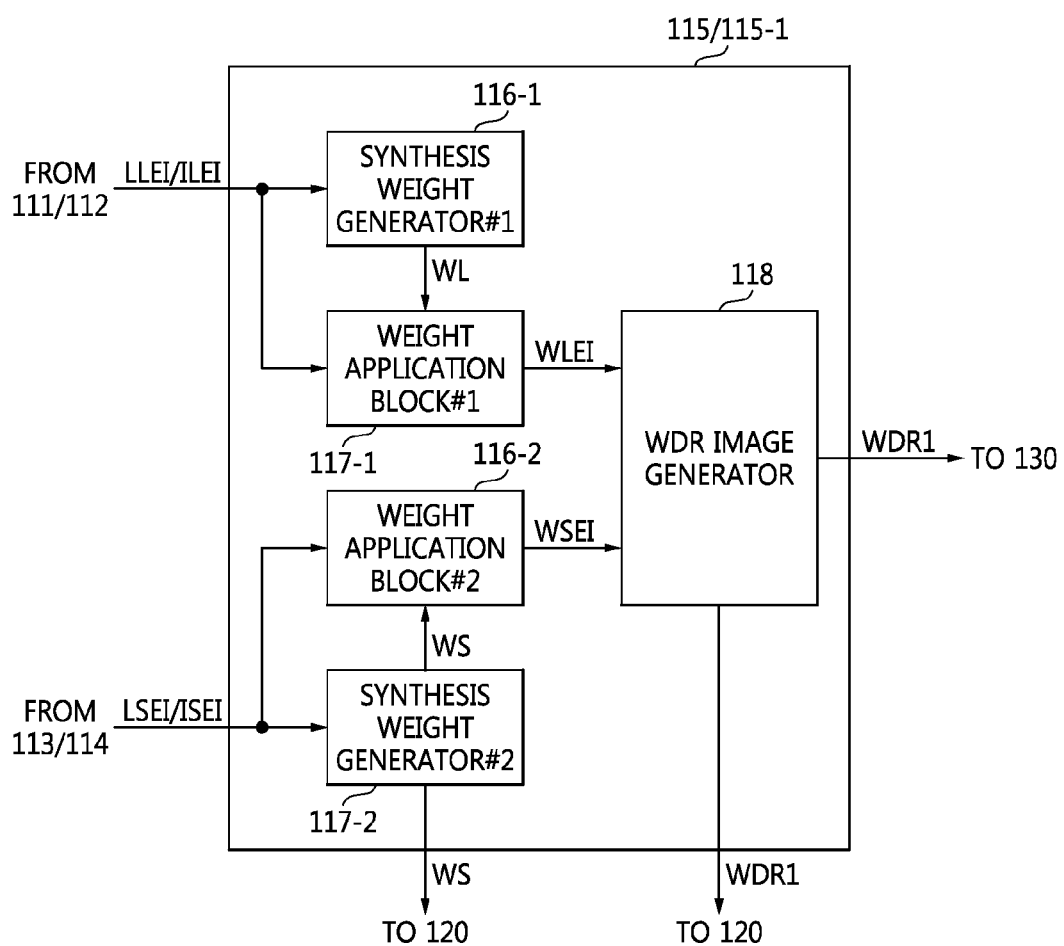
FIG. 6 is a block diagram of a synthesis block shown in FIGS. 4 to 5 according to an exemplary embodiment of the present inventive concept.
Figure 7:
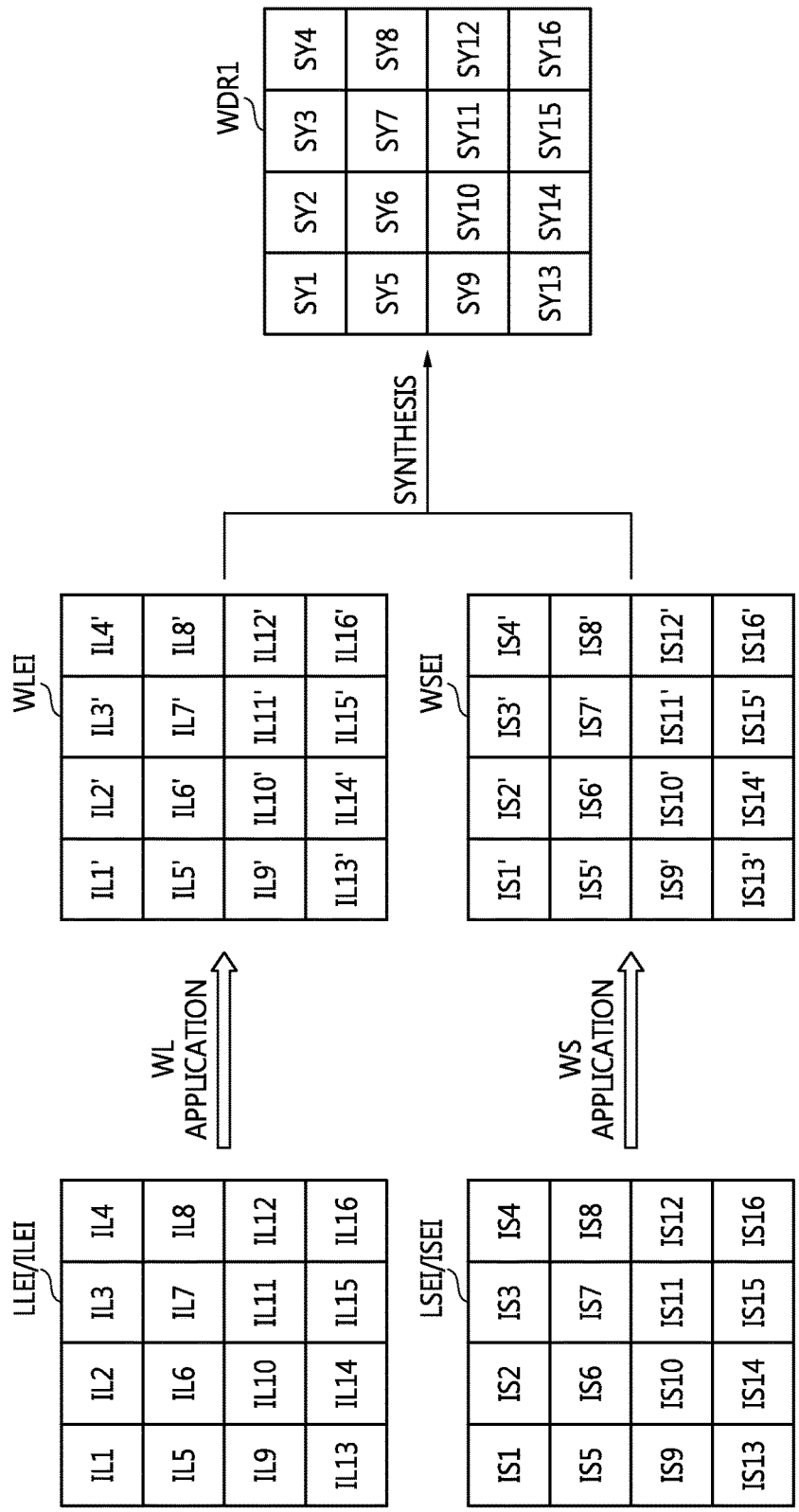
FIG. 7 is a diagram illustrating a synthesis process performed by a synthesis block shown in FIGS. 4 to 5 according to an exemplary embodiment of the present inventive concept.

FIG. 6 is a block diagram of a synthesis block shown in FIGS. 4 to 5 according to an exemplary embodiment of the present inventive concept, FIG. 7 is a diagram illustrating a synthesis process performed by a synthesis block shown in FIGS. 4 to 5 according to an exemplary embodiment of the present inventive concept, and FIG. 8 is a table illustrating a synthesis process shown in FIG. 7 which is performed by a synthesis block according to an exemplary embodiment of the present inventive concept.

Referring to FIG. 6, the synthesis block 115 or 115-1 may include a first synthesis weight generator 116-1, a second synthesis weight generator 116-2, a first weight application block 117-1, a second weight application block 117-2, and a WDR image generator 118. According to an exemplary embodiment of the present inventive concept, the first synthesis weight generator 116-1 may receive the linearized long-exposure image signal LLEI from the first linearization block 111, and generate a first weight value WL based on at least one of a brightness value, a sharpness value, a contrast value, or the like, of the linearized long-exposure image signal LLEI.

According to an exemplary embodiment of the present inventive concept, the first synthesis weight generator 116-1 may receive the first interpolation signal ILEI from the first interpolation block 112, and generate a first weight value WL based on at least one of a brightness value, a sharpness value, a contrast value, or the like, of the first interpolation signal ILEI. For example, the first weight value WL may be determined based on at least one of a brightness value, a sharpness value, a contrast value, or the like, of the long-exposure image signal LLEI.

The first weight application block 117-1 applies the first weight value WL generated from the first synthesis weight generator 116-1 to the linearized long-exposure image signal LLEI or the first interpolation signal ILEI to generate a first image signal WLEI. According to an exemplary embodiment of the present inventive concept, the second synthesis weight generator 116-2 may receive the linearized short-exposure image signal LSEI from the second linearization block 113, and generate a second weight value WS based on at least one of a brightness value, a sharpness value, a contrast value, or the like, of the linearized short-exposure image signal LSEI.

According to an exemplary embodiment of the present inventive concept, the second synthesis weight generator 116-2 may receive the second interpolation signal ISEI from the second interpolation block 114, and generate a second weight value WS based on at least one of a brightness value, a sharpness value, a contrast value, or the like, of the second interpolation signal ISEI. For example, the second weight value WS may be determined based on at least one of a brightness value, a sharpness value, a contrast value, or the like, of the short-exposure image signal SEI.

The second weight application block 117-2 applies the second weight value WS generated by the second synthesis weight generator 116-2 to the linearized short-exposure image signal LSEI or the second interpolation signal ISEI to generate a second image signal WSEI. The WDR image generator 118 may receive the first image signal WLEI from the first weight application block 117-1, receive the second image signal WSEI from the second weight application block 117-2, and synthesize the first image signal WLEI and the second image signal WSEI to generate the first WDR image signal WDR1.

Referring to FIGS. 4 to 7, for convenience of description, it is assumed that one frame of each of the linearized long-exposure image signal LLEI (or the first interpolation signal ILEI in an exemplary embodiment of the present inventive concept) and the linearized short-exposure image signal LSEI (or the second interpolation signal ISEI in an exemplary embodiment of the present inventive concept) includes 16 pixels.

The 16 pixels included in one frame of the linearized long-exposure image signal LLEI (or the first interpolation signal ILEI in an exemplary embodiment of the present inventive concept) have brightness values IL1 to IL16, respectively, and when the first weight value WL is applied to the linearized long-exposure image signal LLEI (or the first interpolation signal ILEI in an exemplary embodiment of the present inventive concept), the 16 pixels included in one frame of the first image signal WLEI have brightness values IL1' to IL16', respectively, which are, for example, adjusted using the first weight value WL.

The 16 pixels included in one frame of the linearized short-exposure image signal LSEI (or the second interpolation signal ISEI in an exemplary embodiment of the present inventive concept) have brightness values IS1 to IS16, respectively, and when the second weight value WS is applied to the linearized short-exposure image signal LSEI (or the second interpolation signal ISEI in an exemplary embodiment of the present inventive concept), the 16 pixels included in one frame of the second image signal WSEI have brightness values IS1' to IS16', which are, for example, adjusted using the second weight value WS. The first WDR image signal WDR1 is generated by synthesizing the first image signal WLEI and the second image signal WSEI, and the 16 pixels included in one frame of the first WDR image signal WDR1 have synthesized brightness values SY1 to SY16, respectively.

Referring to FIGS. 7 to 8, for example, a brightness value of a first pixel, which is included in the linearized short-exposure image signal LSEI or the second interpolation signal ISEI, is "IS2", and a brightness value of a second pixel, which is included in the linearized long-exposure image signal LLEI or the first interpolation signal ILEI and synthesized with the first pixel, is "IL2", a brightness value SY2 of a third pixel, which is included in the first WDR image signal WDR1 and generated by synthesizing the first pixel and the second pixel, is WS2*IS2+WL2*IL2 (where, the symbol '*' indicates multiplication).

Figure 9:
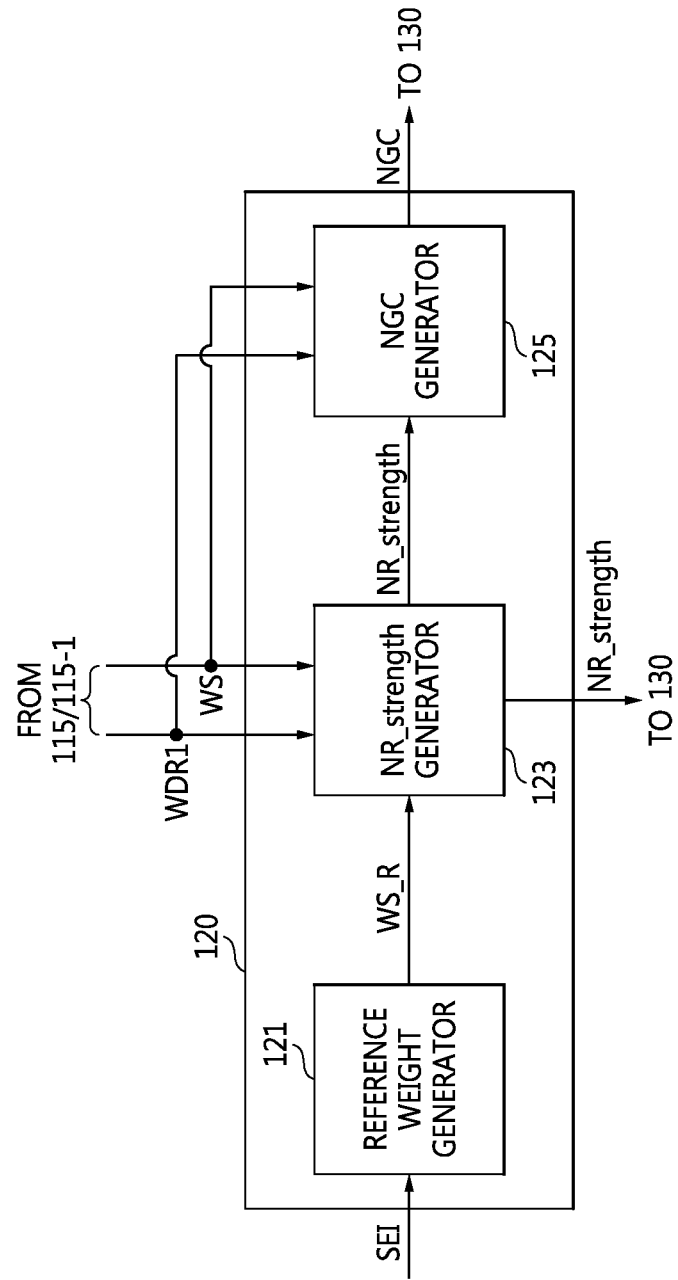
FIG. 9 is a block diagram of a control signal generator shown in FIGS. 4 to 5 according to an exemplary embodiment of the present inventive concept.
Figure 10:
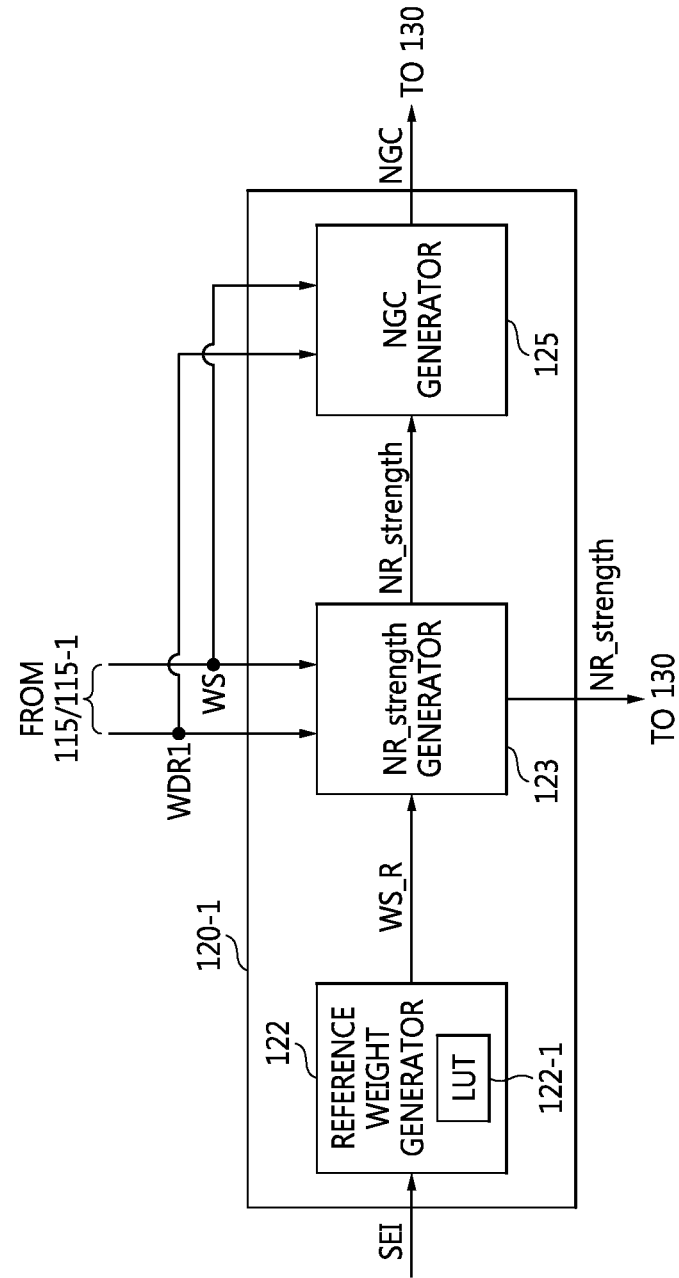
FIG. 10 is a block diagram of a control signal generator shown in FIGS. 4 to 5 according to an exemplary embodiment of the present inventive concept.

FIG. 9 is a block diagram of a control signal generator shown in FIGS. 4 to 5 according to an exemplary embodiment of the present inventive concept, and FIG. 10 is a block diagram of a control signal generator shown in FIGS. 4 to 5 according to an exemplary embodiment of the present inventive concept.

Referring to FIGS. 4 to 6, and 9, the control signal generator 120 may include a reference weight generator 121, a noise reduction strength control signal generator 123, and a noise gain control signal generator 125. The reference weight generator 121 may generate a reference weight value WS_R based on at least one of a brightness value, a sharpness value, a contrast value, or the like, of the short-exposure image signal SEI.

The noise reduction strength control signal generator 123 may receive a reference weight value WS_R from the reference weight generator 121, and receive the first WDR image signal WDR1 and the second weight value WS from the synthesis block 115 or 115-1. The noise reduction strength control signal generator 123 may calculate a difference between the second weight value WS and the reference weight value WS_R, and generate the noise reduction strength control signal NR_strength using the first WDR image signal WDR1 and the difference between the second weight value WS and the reference weight value WS_R.

The noise reduction strength control signal generator 123 may transmit the generated noise reduction strength control signal NR_strength to each of the noise gain control signal generator 125 and the second WDR image generation block 130. The noise gain control signal generator 125 may receive the noise reduction strength control signal NR_strength from the noise reduction strength control signal generator 123, and receive the first WDR image signal WDR1 and the second weight value WS from the synthesis block 115 or 115-1.

The noise gain control signal generator 125 may generate the noise gain control signal NGC using the noise reduction strength control signal NR_strength, the second weight value WS, and the first WDR image signal WDR1. The noise gain control signal generator 125 may transmit the generated noise gain control signal NGC to the second WDR image generation block 130.

Referring to FIGS. 4 to 6, and 10, the control signal generator 120-1 may include a reference weight extractor 122, the noise reduction strength control signal generator 123, and the noise gain control signal generator 125. A structure and an operation of the control signal generator 120-1 shown in FIG. 10 are substantially the same as or similar to the structure and the operation of the control signal generator 120 shown in FIG. 9, except that the reference weight generator 121 of FIG. 9 is replaced with the reference weight extractor 122 of FIG. 10.

The reference weight extractor 122 may extract a reference weight value WS_R corresponding to the short-exposure image signal SEI using a look-up table LUT 122-1 stored in the reference weight extractor 122.

Figure 11:
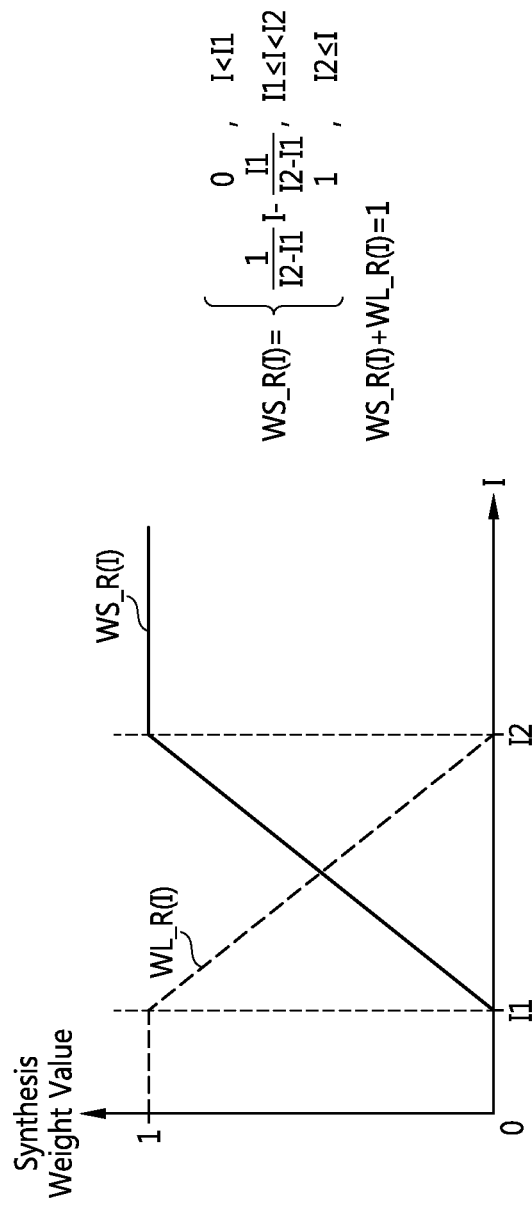
FIG. 11 is a graph illustrating a reference weight value function according to an exemplary embodiment of the present inventive concept.

FIG. 11 is a graph illustrating a reference weight value function according to an exemplary embodiment of the present inventive concept. A horizontal axis of a graph WS_R(I) or WL_R(I) shown in FIG. 11 may be a brightness value I of an image signal, and a vertical axis of the graph WS_R(I) or WL_R(I) shown in FIG. 11 may be a synthesis weight value.

Referring to FIGS. 4 to 6, 9, and 11, the reference weight generator 121 may generate a reference weight value function WS_R(I) according to a brightness value I of the short-exposure image signal SEI. For example, a reference weight value WS_R which corresponds to a value in vertical axis of the reference weight value function WS_R(I) may be determined according to the brightness value I of the short-exposure image signal SEI. According to an exemplary embodiment of the present inventive concept, the reference weight generator 121 may generate the reference weight value function WL_R(I) according to a brightness value I of the long-exposure image signal LEI.

According to an exemplary embodiment of the present inventive concept, referring to FIGS. 4 to 6, 10, and 11, the reference weight extractor 122 may generate the reference weight value function WS_R(I) using values extracted from the look-up table 122-1 based on a brightness value I of the short-exposure image signal SEI. According to an exemplary embodiment of the present inventive concept, the reference weight extractor 122 may directly determine a reference weight value WS_R corresponding to a brightness value I of the short-exposure image signal SEI among the values extracted from the look-up table 122-1.

$$WS\_R(I) = \begin{cases} 0, & I < I1 \\ \frac{1}{I2-I1}I - \frac{I1}{I2-I1}, & I1 \le I < I2 \\ 1, & I2 \le I \end{cases} \quad \text{[Equation 1]}$$

Referring to FIG. 11 and Equation 1, when a brightness value I of the short-exposure image signal SEI is in a range from "0" to a first brightness value I1, the reference weight value function WS_R(I) has a reference weight value WS_R of "0". When the brightness value I of the short-exposure image signal SEI is in a range from the first brightness value I1 to a second brightness value I2 greater than the first brightness value I1, the reference weight value function WS_R(I) has a reference weight value WS_R which linearly increases. When the brightness value I of the short-exposure image signal SEI is equal to or more than the second brightness value I2, the reference weight value function WS_R(I) has a reference weight value WS_R of "1".

For example, the reference weight value WS_R of the short-exposure image signal SEI in a dark region (e.g., indoor) is close to "0", and the reference weight value WS_R of the short-exposure image signal SEI in a bright region (e.g., outdoor) is close to "1".

$$WS\_R(I) + WS\_L(I) = 1 \quad \text{[Equation 2]}$$

Referring to FIG. 11, Equation 1, and Equation 2, a sum of the reference weight value function WS_R(I) generated based on a brightness value I of the short-exposure image signal SEI and the reference weight value function WL_R(I) generated based on a brightness value I of the long-exposure image signal LEI may be "one". Accordingly, when an image signal has a constant brightness value, a noise level control device 100 or 100A for a WDR image according to an exemplary embodiment of the present inventive concept may generate an image in which both a bright region and a dark region look sharp by applying the weight values WS and WL to the short-exposure image signal SEI and the long-exposure image signal LEI, respectively, and synthesizing the two image signals SEI and LEI to which the weight values WS and WL are respectively applied.

Figure 12:
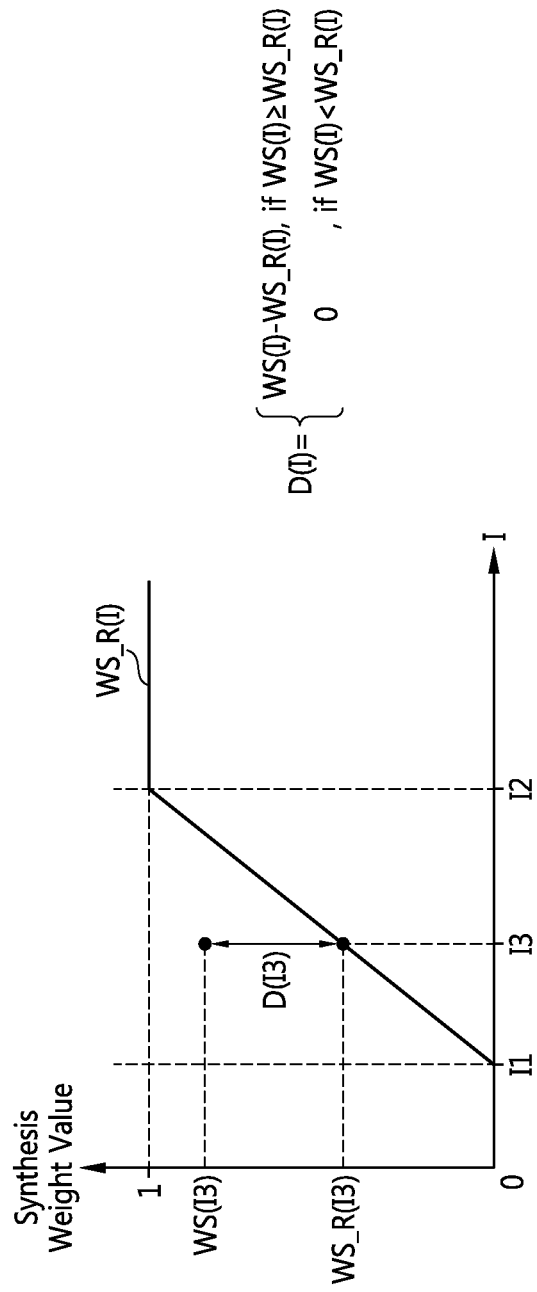
FIG. 12 is a graph illustrating a process of calculating a difference between a reference weight value and a second weight value according to an exemplary embodiment of the present inventive concept.

FIG. 12 is a graph illustrating a process of calculating a difference between a reference weight value and a second weight value according to an exemplary embodiment of the present inventive concept. A horizontal axis of the graph WS_R(I) shown in FIG. 12 may be a brightness value I of an image signal, and a vertical axis of the graph WS_R(I) may be a synthesis weight value. Referring to FIGS. 4 to 12, the noise reduction strength control signal generator 123 generates the noise reduction strength control signal NR_strength based on a difference between the second weight value WS and the reference weight value WS_R. The noise gain control signal generator 125 may generate the noise gain control signal NGC using the noise reduction strength control signal NR_strength.

$$D(I) = \begin{cases} WS(I) - WS\_R(I) & \text{if } WS(I) \ge WS\_R(I) \\ 0, & \text{if } WS(I) < WS\_R(I) \end{cases} \quad \text{[Equation 3]}$$

Referring to Equation 3, "D(I)" is a differential function D(I) which represents a difference between a second weight value function WS(I) according to a brightness value I of the short-exposure image signal SEI and a reference weight value function WS_R(I) according to the brightness value I of the short-exposure image signal SEI.

When a value of the second weight value function WS(I) is equal to or larger than a value of the reference weight value function WS_R(I), the differential function D(I) has a value of "WS(I)−WS_R(I)". When a value of the second weight value function WS(I) is smaller than a value of the reference weight value function WS_R(I), the differential function D(I) has a value of "0" and a difference between the second weight value WS and the reference weight value WS_R is not considered during generation of the noise reduction strength control signal NR_strength. For example, referring to FIG. 12, when a brightness value I of the short-exposure image signal SEI is "I3", the differential function D(I) has a value of "WS(I3)−WS_R(I3)".

$$S(I) = SL(I) \times (1 + (wd \cdot D(I)) \cdot (wi \cdot (\text{MaxCode}-1))) \quad \text{[Equation 4]}$$

Referring to Equation 4, "S(I)" is a function of the noise reduction strength control signal NR_strength according to the brightness value I of the short-exposure image signal SEI. "SL(I)" may be a function of a noise reduction strength control signal obtained by considering only a brightness value of an image signal. "wd" may be a weight value factor obtained by considering D(I) shown in Equation 3. "wi" may be a weight value factor obtained by considering the brightness value I of the short-exposure image signal SEI. "MaxCode" may be a maximum bit value (for example, when the short-exposure image signal SEI is 10 bits, the maximum bit value is "1023") of the short-exposure image signal SEI.

$$G(I) = wg \cdot \frac{GL(I)}{S(I)} \quad \text{[Equation 5]}$$

Referring to Equation 5, 'G(I)' may be a function of the noise gain control signal NGC according to the brightness value I of the short-exposure image signal SEI. "S(I)" may be the function of the noise reduction strength control signal NR_strength described in Equation 4. "wg" may be a weight value factor obtained by considering S(I) shown in Equation 4. GL(I) may be a function of a noise control signal obtained by considering only the brightness value of the image signal.

Referring to FIGS. 4 to 12, and Equations 3 to 5, when the second weight value WS is larger than the reference weight value WS_R, the control signal generator 120 may generate a larger noise reduction strength control signal NR_strength and a smaller noise gain control signal NGC as a difference between the second weight value WS and the reference weight value WS_R becomes larger. In addition, when the second weight value WS is larger than the reference weight value WS_R, the control signal generator 120 may generate a smaller noise reduction strength control signal NR_strength and a larger noise gain control signal NGC as the difference between the second weight value WS and the reference weight value WS_R becomes smaller.

Figure 13:
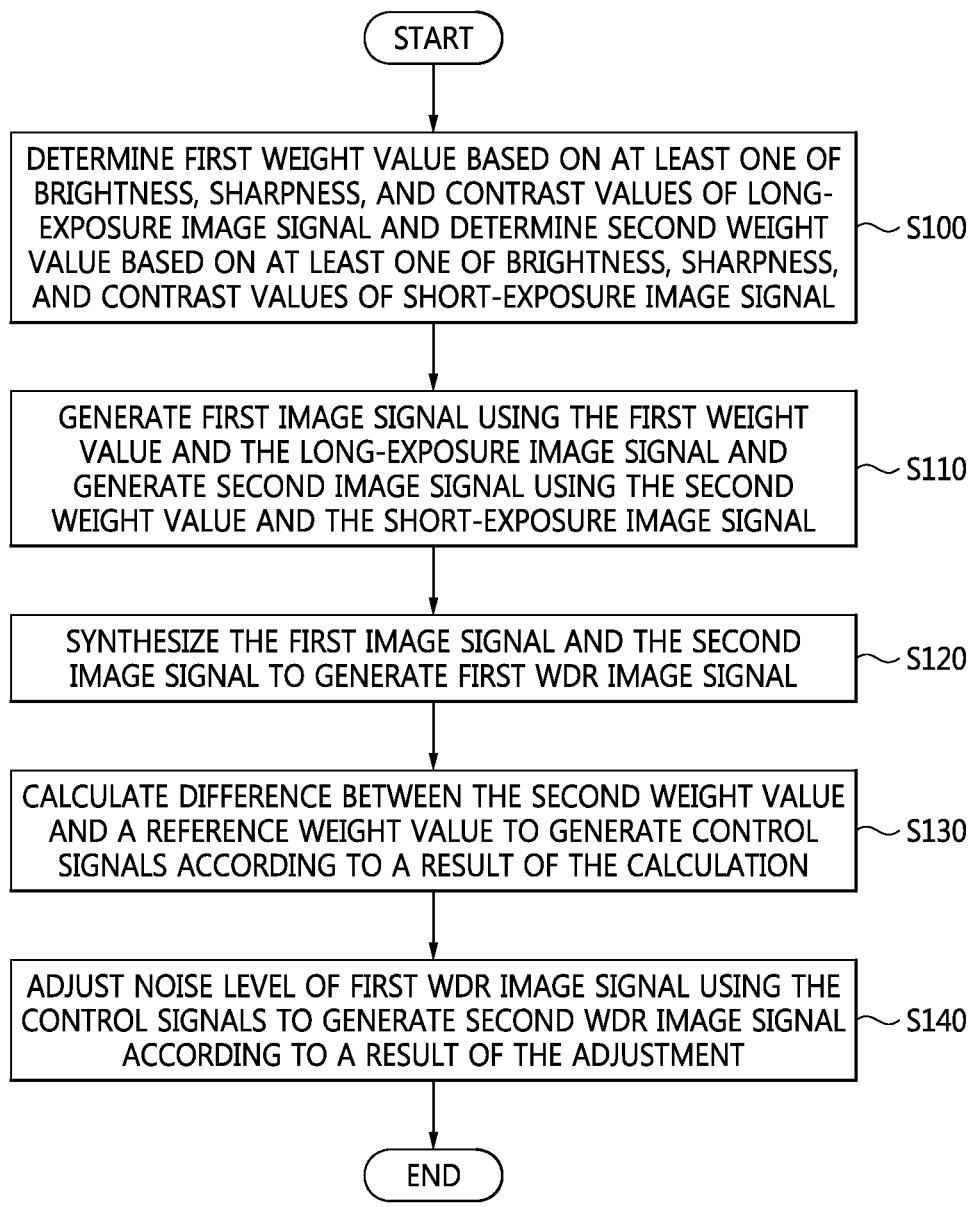
FIG. 13 is a flowchart illustrating an operation of a noise level control device for a WDR image according to an exemplary embodiment of the present inventive concept.

FIG. 13 is a flowchart illustrating an operation of a noise level control device for a WDR image according to an exemplary embodiment of the present inventive concept. Referring to FIGS. 4 to 13, the noise level control device 100 or 100A may determine the first weight value WL based on at least one of a brightness value, a sharpness value, a contrast value, or the like, of the long-exposure image signal LEI, and determine the second weight value WS based on at least one of a brightness value, a sharpness value, a contrast value, or the like, of the short-exposure image signal SEI (S100).

The noise level control device 100 or 100A may generate a first image signal WLEI using the first weight value WL and the long-exposure image signal LEI, and generate a second image signal WSEI using the second weight value WS and the short-exposure image signal SEI (S110). The noise level control device 100 or 100A may generate a first WDR image signal WDR1 by synthesizing the first image signal WLEI and the second image signal WSEI (S120).

The noise level control device 100 or 100A may calculate a difference between the second weight value WS and the reference weight value WS_R, and generate control signals NR_strength and NGC according to a result of the calculation (S130). The noise level control device 100 or 100A may adjust a noise level of the first WDR image signal WDR1 using the control signals NR_strength and NGC, and generate a second WDR image signal WDR2 according to a result of the adjustment (S140).

Figure 14:
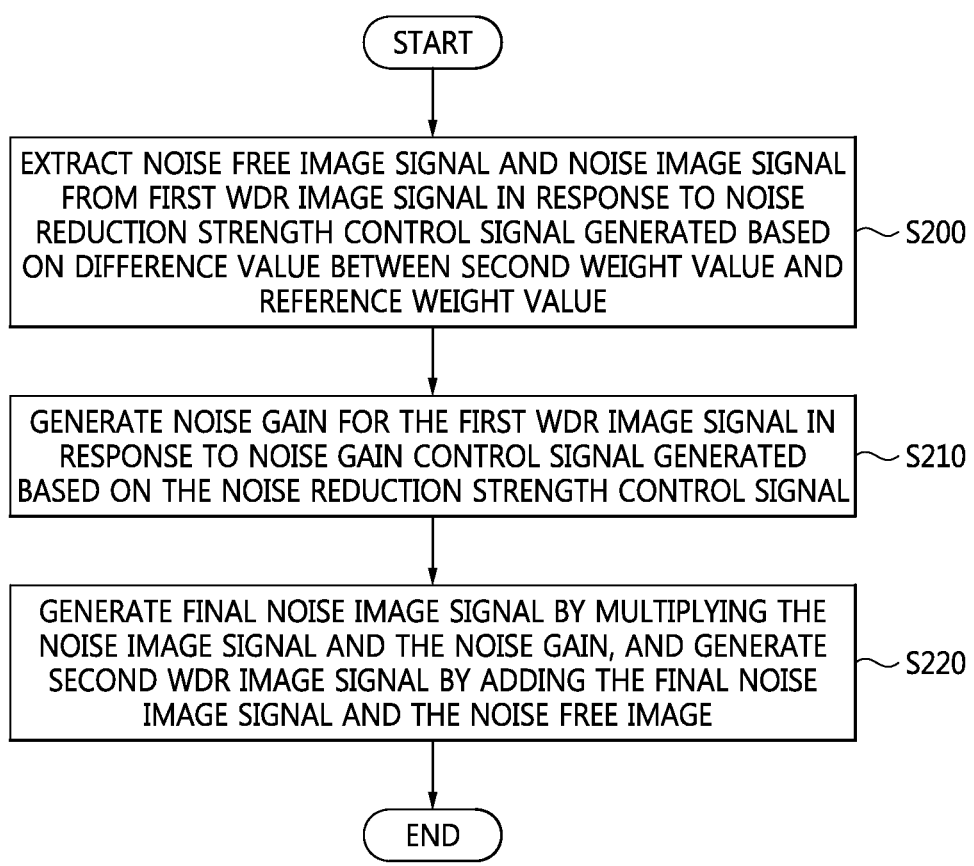
FIG. 14 is a flowchart illustrating an operation of a second WDR image generation block shown in FIGS. 4 to 5 according to an exemplary embodiment of the present inventive concept.

FIG. 14 is a flowchart illustrating an operation of a second WDR image generation block shown in FIGS. 4 to 5 according to an exemplary embodiment of the present inventive concept. Referring to FIGS. 4 to 14, the second WDR image generation block 130 may extract a noise-free image signal NFS and a noise image signal NS from the first WDR image signal WDR1 in response to the noise reduction strength control signal NR_strength generated based on a difference value between the second weight value WS and the reference weight value WS_R (S200).

The second WDR image generation block 130 may generate a noise gain NG for the first WDR image signal WDR1 in response to a noise gain control signal NGC generated based on the noise reduction strength control signal NR_strength (S210). The second WDR image generation block 130 may generate a final noise image signal by multiplying the noise image signal NS and the noise gain NG, and generate the second WDR image signal WDR2 by adding the final noise image signal and the noise gain NG (S220).

Figure 15:
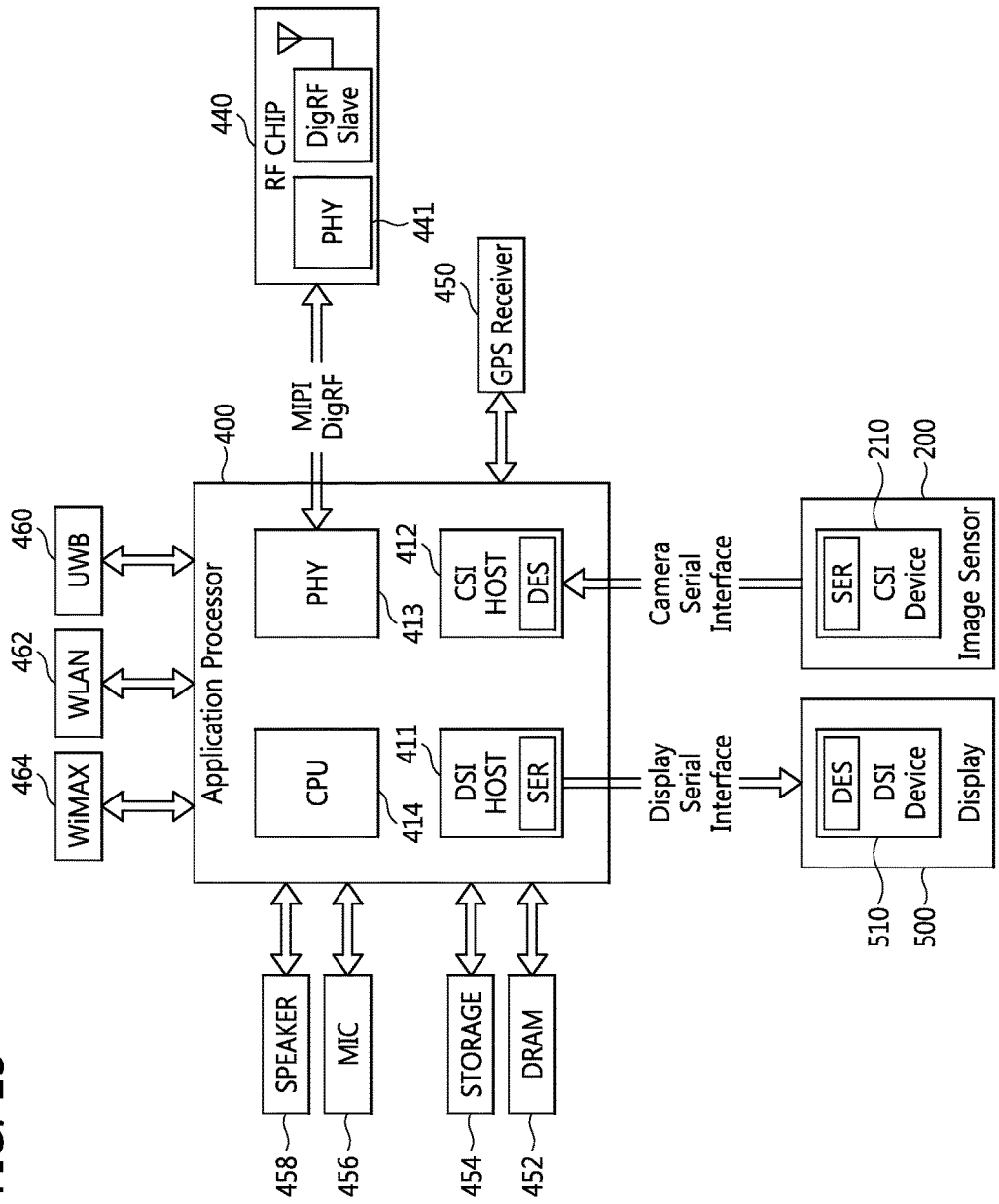
FIG. 15 is a block diagram of an image processing system according to an exemplary embodiment of the present inventive concept.

FIG. 15 is a block diagram of an image processing system according to an exemplary embodiment of the present inventive concept. Referring to FIGS. 1 to 15, an image processing system 20 may be embodied as an image processing system which can use or support a mobile industry processor interface (MIPI). The image processing system 20 may be embodied as a mobile computing device.

The image processing system 20 may include the CMOS image sensor 200, the AP 400, and the display 500. The noise level control device 100 or 100A for a WDR image described with reference to FIGS. 1 to 14 may be embodied in the CMOS image sensor 200 or in the AP 400.

A camera serial interface (CSI) host 412 embodied in the AP 400 may perform a serial communication with a CSI device 210 of the CMOS image sensor 200 through a CSI. According to an exemplary embodiment of the present inventive concept, the CSI host 412 may include a de-serializer DES, and the CSI device 210 may include a serializer SER.

A display serial interface (DSI) host 411 embodied in the AP 400 may perform a serial communication with a DSI device 510 of the display 500 through a DSI. According to an exemplary embodiment of the present inventive concept, the DSI host 411 may include a serializer SER, and the DSI device 510 may include a de-serializer DES. For example, image data (for example, IDATA of FIG. 1) output from the CMOS image sensor 200 may be transmitted to the AP 400 through a CSI. The AP 400 may process the transmitted image data (for example, IDATA of FIG. 1), and transmit the processed image data to the display 500 through the DSI.

The image processing system 20 may further include a RF chip 440 which can communicate with the AP 400. A physical layer (PHY) 413 of the image processing system 20 and a physical layer (PHY) 441 of the RF chip 440 may transmit or receive data to or from each other according to MIPI DigRF. The CPU 414 may control an operation of each of the DSI host 411, the CSI host 412, and the PHY 413, and include one or more cores.

The AP 400 may be embodied as an integrated circuit (IC) or a system on chip (SoC), and may be a processor or a host which can control an operation of the CMOS image sensor 200.

The image processing system 20 may include a global positioning system (GPS) receiver 450, a volatile memory 452 such as a dynamic random access memory (DRAM), or the like, a data storage device 454 embodied as a non-volatile memory such as a flash-based memory, or the like, a microphone 456, and/or a speaker 458. The data storage device 454 may be embodied as a detachable external memory. In addition, the data storage device 454 may be embodied as a universal flash storage (UFS), a multimedia card (MMC), an embedded MMC (eMMC), a USB flash drive, a memory card, or the like.

In addition, the image processing system 20 may communicate with an external device using at least one communication protocol (or communication standard) such as a ultra-wideband (UWB) 460, a wireless local area network (WLAN) 462, a worldwide interoperability for microwave access (WiMAX) 464, a long term evolution (LTE), or the like. According to an exemplary embodiment of the present inventive concept, the image processing system 20 may further include at least one of a near field communication (NFC) module, a Wi-Fi module, and a Bluetooth module.

Figure 16:
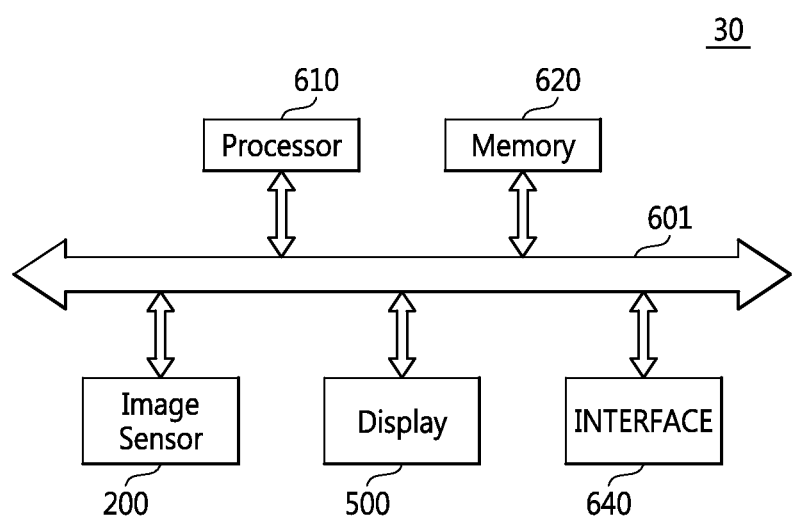
FIG. 16 is a block diagram of an image processing system according to an exemplary embodiment of the present inventive concept.

FIG. 16 is a block diagram of an image processing system according to an exemplary embodiment of the present inventive concept. Referring to FIGS. 1 to 16, an image processing system 30 may include the CMOS image sensor 200, a processor 610, a memory 620, the display 500, and an interface 640. The noise level control device 100 or 100A for a WDR image described with reference to FIGS. 1 to 14 may be embodied in the processor 610 or in the CMOS image sensor 200.

The processor 610 may control an operation of the CMOS image sensor 200. For example, the processor 610 may process a pixel signal output from the CMOS image sensor 200 to generate image data.

The memory 620 may store a program for controlling the operation of the CMOS image sensor 200 and the image data generated by the processor 610. The processor 610 may execute the program stored in the memory 620. For example, the memory 620 may be embodied as a volatile memory or a non-volatile memory. The display 500 may display the image data output from the processor 610 or the memory 620.

The interface 640 may be embodied as an interface for inputting or outputting image data. According to an exemplary embodiment of the present inventive concept, the interface 640 may be embodied as a radio interface or a wireless interface.

A noise level control device for a wide dynamic range (WDR) image according to an exemplary embodiment of the present inventive concept can adjust a noise level in a border region of images having different exposure times from each other when the images are synthesized, and thus, image quality of the WDR image can be increased.

Although the present inventive concept has been particularly shown and described with reference to exemplary embodiments thereof, it will be understood that various changes in forms and details may be made in these embodiments without departing from the spirit and scope of the present inventive concept as defined in the appended claims.

What is claimed is:

1. An image processing device comprising:
a first wide dynamic range (WDR) image generation block configured to process a long-exposure image signal using a first weight value, to generate a first image signal according to a result of the processing on the long-exposure image signal, to process a short-exposure image signal using a second weight value, to generate a second image signal according to a result of the processing on the short-exposure image signal, and to synthesize the first image signal and the second image signal to generate a first WDR image signal;
a control signal generator configured to calculate a difference between the second weight value and a reference weight value, and to generate control signals according to a result of the calculation; and
a second WDR image generation block configured to adjust a noise level of the first WDR image signal using the control signals, and to generate a second WDR image signal according to a result of the adjustment,
wherein the long-exposure image signal is generated using a first exposure time, and
wherein the short-exposure image signal is generated using a second exposure time shorter than the first exposure time.

2. The device of claim 1, wherein the first WDR image generation block linearizes each of the short-exposure image signal and the long-exposure image signal, generates the first image signal by applying the first weight value to the linearized long-exposure image signal, and generates the second image signal by applying the second weight value to the linearized short-exposure image signal.

3. The device of claim 2, wherein the first WDR image generation block interpolates the linearized long-exposure image signal to generate a first interpolation signal, applies the first weight value to the first interpolation signal to generate the first image signal, interpolates the linearized short-exposure image signal to generate a second interpolation signal, and applies the second weight value to the second interpolation signal to generate the second image signal.

4. The device of claim 1, wherein a sum of the first weight value and the second weight value is one.

5. The device of claim 1, wherein the first weight value is determined based on at least one of a brightness value, a sharpness value, or a contrast value of the long-exposure image signal, and
wherein the second weight value is determined based on at least one of a brightness value, a sharpness value, or a contrast value of the short-exposure image signal.

6. The device of claim 1, wherein the reference weight value is determined based on at least one of a brightness value, a sharpness value, or a contrast value of the short-exposure image signal.

7. The device of claim 1, wherein the reference weight value is extracted from a look-up table stored in the control signal generator.

8. The device of claim 1, wherein the control signals include a noise reduction strength control signal and a noise gain control signal.

9. The device of claim 8, wherein, when the second weight value is larger than the reference weight value, the control signal generator increases the noise reduction strength control signal and decreases the noise gain control signal as the difference between the second weight value and the reference weight value increases.

10. The device of claim 8, wherein, when the second weight value is larger than the reference weight value, the control signal generator decreases the noise reduction strength control signal and increases the noise gain control signal as the difference between the second weight value and the reference weight value decreases.

11. The device of claim 8, wherein the control signal generator includes:
a reference weight block configured to determine the reference weight value;
a noise reduction strength control signal generator configured to calculate the difference between the second weight value and the reference weight value, and to generate the noise reduction strength control signal by using the first WDR image signal and the difference between the second weight value and the reference weight value; and
a noise gain control signal generator configured to generate the noise gain control signal by using the noise reduction strength control signal, the second weight value, and the first WDR image signal.

12. The device of claim 8, wherein the second WDR image generation block includes:
a noise reduction circuit configured to extract a noise-free image signal and a noise image signal from the first WDR image signal in response to the noise reduction strength control signal;
a noise gain generator configured to generate a noise gain for the first WDR image signal in response to the noise gain control signal; and
an operation block configured to generate a final noise image signal by multiplying the noise image signal and the noise gain, and to generate the second WDR image signal by adding the final noise image signal and the noise-free image signal.

13. An image processing system comprising:
an image sensor configured to output a long-exposure image signal and a short-exposure image signal; and
a noise level control device configured to process the long-exposure image signal and the short-exposure image signal, and to adjust a noise level of a first WDR image signal, and to generate a second WDR image signal according to a result of the adjustment,
wherein the noise level control device includes:
a first WDR image generation block configured to process the long-exposure image signal using a first weight value, to generate a first image signal according to a result of the processing on the long-exposure image signal, to process the short-exposure image signal using a second weight value, to generate a second image signal according to a result of the processing on the short-exposure image signal, and to synthesize the first image signal and the second image signal to generate the first WDR image signal;

a control signal generator configured to calculate a difference between the second weight value and a reference weight value, and to generate control signals according to a result of the calculation; and a second WDR image generation block configured to adjust a noise level of the first WDR image signal using the control signals, and to generate the second WDR image signal according to a result of the adjustment, wherein the long-exposure image signal is generated using a first exposure time, and wherein the short-exposure image signal is generated using a second exposure time shorter than the first exposure time.

14. The image processing system of claim 13, wherein the control signals include a noise reduction strength control signal and a noise gain control signal.

15. The image processing system of claim 14, wherein the second WDR image generation block includes:

a noise reduction circuit configured to extract a noise-free image signal and a noise image signal from the first WDR image signal in response to the noise reduction strength control signal;

a noise gain generator configured to generate a noise gain for the first WDR image signal in response to the noise gain control signal; and an operation block configured to generate a final noise image signal by multiplying the noise image signal and the noise gain, and to generate the second WDR image signal by adding the final noise image signal and the noise-free image signal.

16. An image processing method comprising:

determining a first weight value based on a long-exposure image signal generated using a first exposure time;

determining a second weight value based on a short-exposure image signal generated using a second exposure time shorter than the first exposure time;

generating a first image signal based on the first weight value and the long-exposure image signal;

generating a second image signal based on the second weight value and the short-exposure image signal;

generating a third image signal by combining the first image signal and the second image signal;

adjusting a noise level of the third image signal using control signals, the control signals generated based on a relation between the second weight value and a reference weight value; and generating a fourth image signal based on a result of the adjustment of the third image signal.

17. The method of claim 16, wherein the control signals include a noise reduction strength control signal and a noise gain control signal generated based on a difference between the second weight value and the reference weight value.

18. The method of claim 16, wherein the first weight value is determined based on at least one of a brightness value, a sharpness value, or a contrast value of the long-exposure image signal, and wherein the second weight value is determined based on at least one of a brightness value, a sharpness value, or a contrast value of the short-exposure image signal.

19. The method of claim 17, wherein the reference weight value is determined based on at least one of a brightness value, a sharpness value, or a contrast value of the short-exposure image signal.

20. The method of claim 17, wherein the adjusting a noise level of the third image signal includes:

extracting a noise free image signal and a noise image signal from the first image signal using the noise reduction strength control signal;

generating a noise gain corresponding to the first image signal using the noise gain control signal;

generating a final noise image signal by using the noise image signal and the noise gain; and generating the fourth image signal by using the final noise image signal and the noise free image signal.

* * * * *